(12) United States Patent
Malmskog et al.

(10) Patent No.: US 6,721,686 B2
(45) Date of Patent: Apr. 13, 2004

(54) SERVER LOAD TESTING AND MEASUREMENT SYSTEM

(75) Inventors: Steve Malmskog, San Jose, CA (US); Khurram Saqlain, Newark, CA (US)

(73) Assignee: Redline Networks, Inc., Campbell, CA (US)

(*) Notice: Subject to any disclaimer, the term of this patent is extended or adjusted under 35 U.S.C. 154(b) by 100 days.

(21) Appl. No.: 09/975,531

(22) Filed: Oct. 10, 2001

(65) Prior Publication Data

US 2003/0069957 A1 Apr. 10, 2003

(51) Int. Cl.[7] .............................. G06F 11/30; G06F 15/00
(52) U.S. Cl. ........................ 702/186; 702/122; 709/224
(58) Field of Search .............................. 702/108, 119, 702/123, 176–178, 181–183, 186–188; 714/43, 47

(56) References Cited

U.S. PATENT DOCUMENTS

| 5,793,976 A | * | 8/1998 | Chen et al. ................. 709/224 |
| 5,812,780 A | * | 9/1998 | Chen et al. ................. 709/224 |
| 5,974,572 A | * | 10/1999 | Weinberg et al. ............. 714/47 |
| 6,434,513 B1 | * | 8/2002 | Sherman et al. ............ 702/186 |
| 6,446,120 B1 | * | 9/2002 | Dantressangle ............ 709/224 |
| 6,477,483 B1 | * | 11/2002 | Scarlat et al. .............. 702/186 |
| 2002/0073058 A1 | * | 6/2002 | Kremer et al. ................ 707/1 |
| 2002/0138226 A1 | * | 9/2002 | Doane ........................ 702/119 |
| 2002/0198684 A1 | * | 12/2002 | Gross et al. ................ 702/186 |
| 2003/0046383 A1 | * | 3/2003 | Lee et al. ................... 709/224 |

OTHER PUBLICATIONS

Banga and Druschel, "Measuring the Capacity of a Web Server," *Proceedings of the USENIX Symposium on Internet Technologies and Systems*, Monterey, California, Dec. 1997.
KQUEUE(2) *FreeBSD System Calls Manual*, Apr. 14, 2000.

* cited by examiner

Primary Examiner—Marc S. Hoff
Assistant Examiner—Manuel L Barbee
(74) Attorney, Agent, or Firm—Kolisch Hartwell, P.C.

(57) ABSTRACT

A server load test system, device, and method for generating an artificial load and evaluating the performance of a web server. The load test system configured to generate a pool of synthetic clients and direct each synthetic client to request resources from the web server.

38 Claims, 4 Drawing Sheets

Group Configuration Interface (38)

- Name: ▽ DSL (40)
- Group Weight: ▽ 60% (42)
- Delay: ▽ 5 milliseconds (44)
- Bandwidth: ▽ 9 Mbs (46)
- Qsize: ▽ 10 Kbytes (48)
- Packet Loss Rate: ▽ 0.05 (50)
- Interface: ▽ fxpo (52)
- Broadcast IP: ▽ 192.168.255.255 (54)
- Netmask: ▽ 226.225.225.0 (56)
- Virtual IP List: ▽ 192.168.4.100
  ▽ 192.168.4.101
  ▽ 192.168.4.102 (58)

FIG. 6

Scenario Configuration Interface (60, 62)

- Scenario Name: ▽ Redline Networks
- Scenario Resource List: http://www.RedlineNetworks.com
  http://www.RedlineNetworks.com/m/ (64)
- Request Count: 10000 (66)
- Weighting: ▽ Percent (68)
- 25%
  75% (70)
- Generate Scenario From Server Log (72)
- OK (74)

FIG. 7

SERVER LOAD TESTING AND MEASUREMENT SYSTEM

TECHNICAL FIELD

The present invention relates generally to data transmission on computer networks, and more particularly to a server load testing and measurement system.

BACKGROUND OF THE INVENTION

The World Wide Web (Web) has proliferated over the past decade, to become an essential tool in modern communication and commerce. The number of users accessing the Web, as well as the content available on the Web, have grown exponentially. With this growth, performance demands placed upon Web servers has increased, and now manufacturers strive to develop faster web servers. Unfortunately, test equipment technology lags far behind current web server technology, such that manufacturers are unable to accurately test and measure the performance of their web servers.

Prior efforts to generate synthetic HTTP client traffic for measuring server performance have suffered from the problem that as the testing tool application attempts to increase the request generation rate, the server may become overloaded and unintentionally slow the request generation rate. This problem, explained in more detail below, is referred to as request generation throttling, and leads to inaccurate test results, thereby slowing the development of faster web server technology.

It would be desirable to provide a server load test system that does not experience request throttling, and which allows a user to simulate easily real-world request load.

SUMMARY OF THE INVENTION

A server load test system, device, and method for generating an artificial load on a web server and evaluating the performance of the Web server. The method typically includes the steps of generating a pool of more than about 1000 synthetic clients, and directing each synthetic client to request web resources from the web server.

According to another aspect of the invention, the method may also include generating a pool of synthetic clients, and establishing groups of clients within the pool of synthetic clients. Each group of clients is typically configured to simulate a user-specified performance parameter, such as connection bandwidth, packet loss rate, delay, Qsize, weighting, network interface, netmask, etc.

The system may include a load testing tool application having a request generator configured to generate a plurality of synthetic clients, each client being configured to send HTTP requests to the web server via a network. The request generator is typically configured to generate more than about 1000 synthetic clients simultaneously connected to the web server.

According to another aspect of the invention, the system also may include a request generator configured to generate a pool of synthetic clients, each client being configured to send HTTP requests to the web server. The system may further include a group configuration interface configured to enable a user to specify a performance parameter for each of a plurality of groups of synthetic clients within the pool of synthetic clients.

According to another aspect of the invention, the system may include request generator configured to generate a pool of synthetic clients, each client being configured to send HTTP requests to the web server. The system may further include a scenario generator configured to generate a scenario of web resources that the synthetic clients are to request. The scenario generator typically is configured to generate the scenario based on log data from the web server.

BRIEF DESCRIPTION OF THE DRAWINGS

FIG. 6 is a group configuration interface configured to display and manipulate group configuration parameters.

FIG. 7 is a scenario configuration interface configured to display and manipulate scenario configuration parameters.

DETAILED DESCRIPTION OF THE INVENTION

Figure 1:
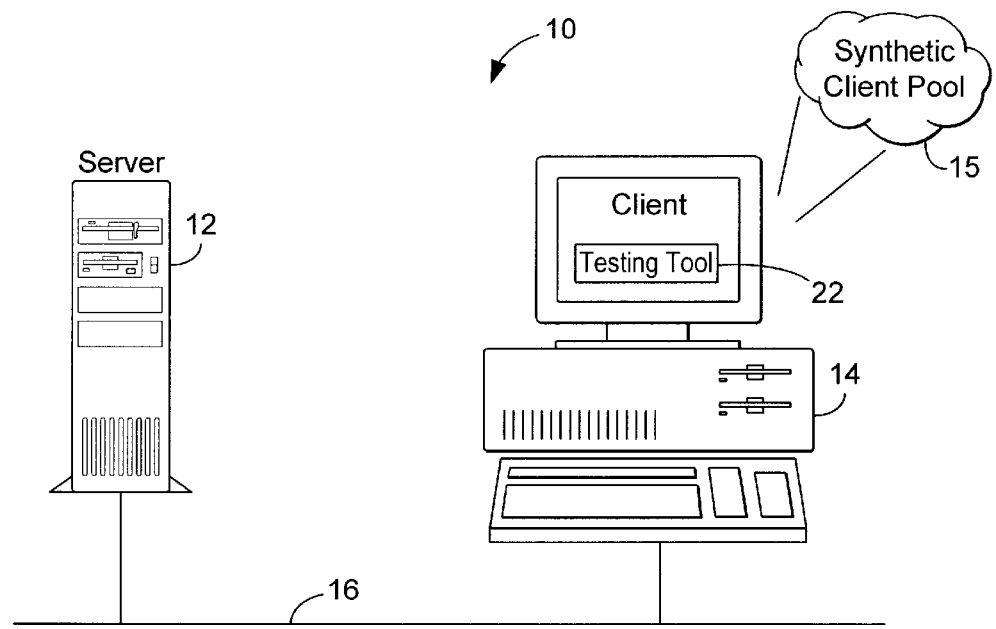
FIG. 1 is a schematic view of a server load test system according to one embodiment of the present invention.

Referring initially to FIG. 1, a web server load test system according to one embodiment of the present invention is indicated generally at 10. Test system 10 typically includes a web server 12 connected to a client 14 via a local area network (LAN) 16. Alternatively, another suitable type of network may be used. Client 14 is typically a personal computer such as a network workstation. As shown, client 14 typically is a single computer, but it should be understood that multiple workstations may be used to implement the web server load test system of the present invention.

Server 12 is typically a web server configured to serve web resources (such as HTML files, images, text, video, sound, etc.) in response to HTTP requests from client 14. Server 12 typically includes a network interface configured to send and receive data over network 16. Server 12 may run virtually any operating system, such as Unix, Linux, MacOS, or Windows.

System 10 further includes a testing tool application 22 configured to run on client 14. Testing tool application 22 is configured to generate synthetic HTTP client traffic on server 12, and measure the performance of server 12 under the synthetic load. Testing tool application 22 is configured to simulate a large number of synthetic clients 15 sending HTTP requests to server 12. These synthetic clients are collectively referred to as a synthetic client pool 15.

Figure 2:
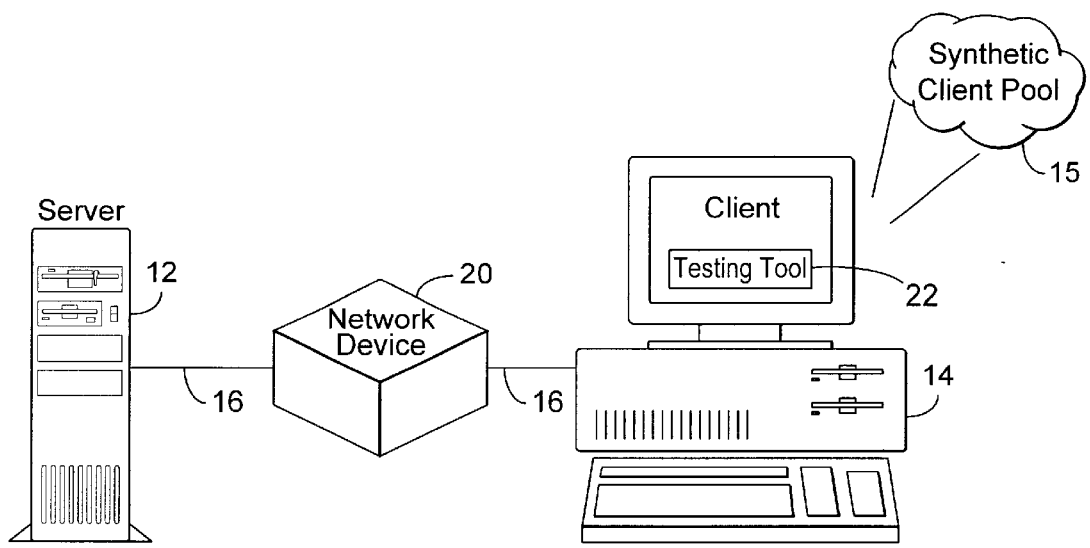
FIG. 2 is a schematic view of a server load test system according to another embodiment of the present invention, including a network device.

Turning to FIG. 2, system 10 may further include a network device 20. Network device 20 may be a load balancer, content accelerator, or other network device configured to process traffic between server 12 and client 14. Testing tool application 22 may be used to test server 12 and network device 20. First, a baseline test of server 12 without the aid of network device 20 may be conducted, followed by a test of server 12 in combination with network device 20 for comparison with the baseline test. In this manner, the performance improvement achieved using the network device may be determined in a controlled test setting.

Figure 3:
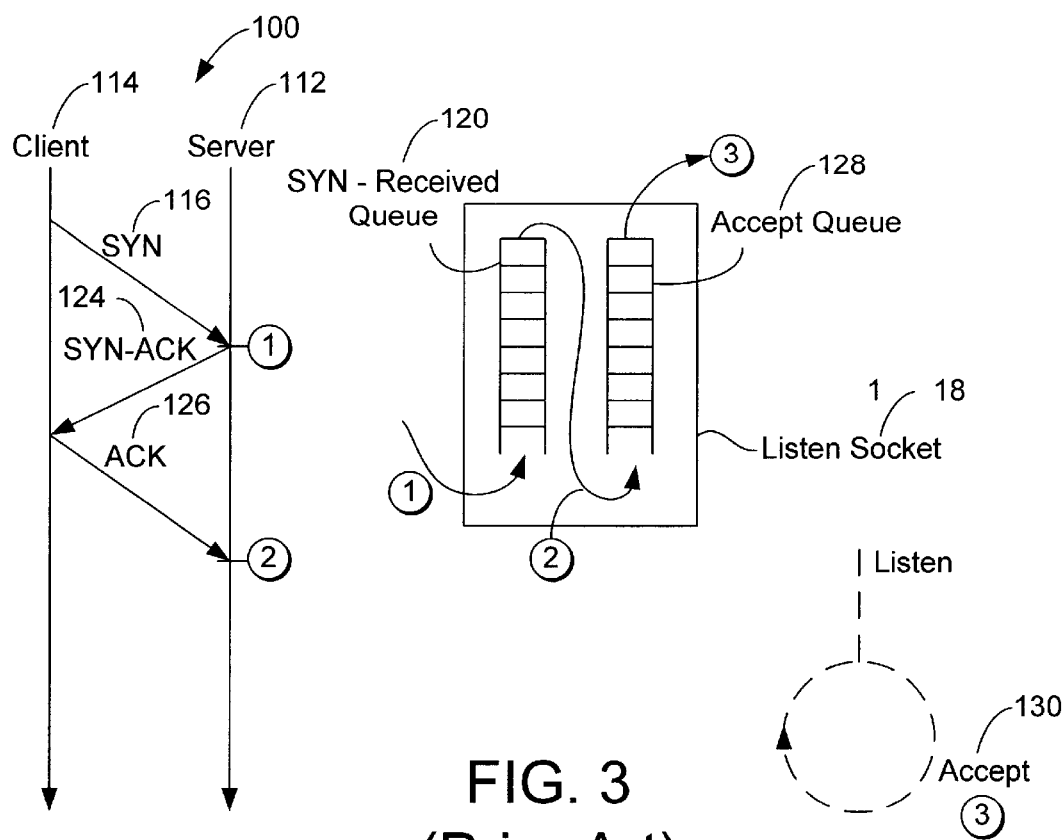
FIG. 3 is a schematic view of a prior art server and a client exchanging TCP control packets.

Turning to FIG. 3, request generation throttling will be explained in detail. Due to the dynamics of HTTP and TCP/IP network communication, the generation of synthetic HTTP traffic loads is a nontrivial problem. Under simulated high loads, the server may actually throttle, or limit, the rate at which a client testing tool application makes web resource requests. This is known as request generation throttling or test harness throttling.

FIG. 3 shows a time line for establishing a TCP connection, indicated generally at 100. Initially, a client 114 will request the establishment of a connection with server 112 by sending a SYN packet 116 to server 112. The server receives the SYN packet at a listen socket 118 and stores SYN packet 116 in a SYN-RCVD queue 120, as shown at (1). When the server places the SYN packet in the SYN-RCVD queue it sends a SYN-ACK packet 124 back to client 114. When the client receives the SYN-ACK packet it responds by sending the server an ACK packet 126. Listen socket 118 processes SYN packets by moving them from the SYN-RCVD queue to an accept queue 128 when the server receives the ACK packet, as shown at (2). As the server executes accept routines 130, shown at (3), SYN requests waiting in the accept queue are processed and the HTTP request is read. The server responds by sending the requested resource back to the client, and the socket associated with that SYN packet is closed.

Figure 4:
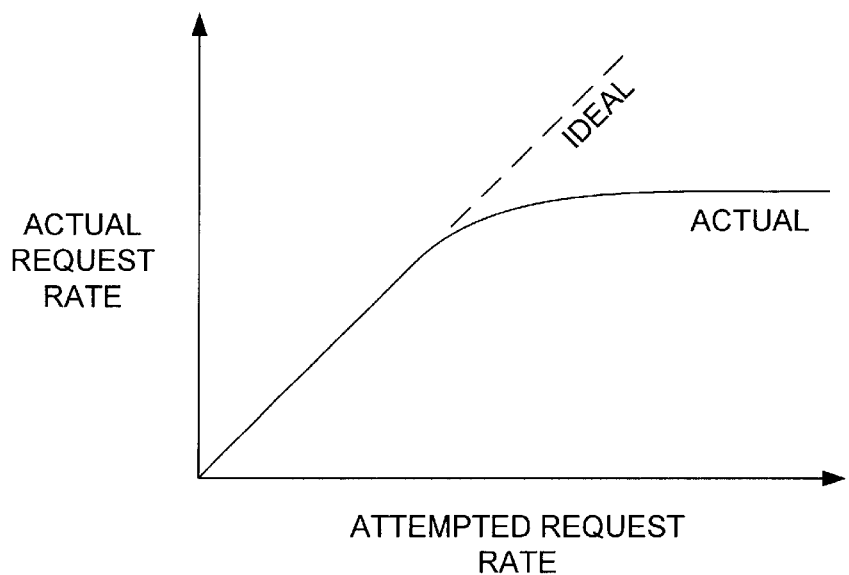
FIG. 4 is a graph of attempted request rate versus actual request rate for prior art servers.

The length of the SYN-RCVD and accept queues are controlled by the TCP/IP routines, which are typically part of the kernel of the operating system on both the client, and the server. Under heavy traffic conditions, when web resource requests are coming into the server at high rates, the SYN-RCVD and accept queues may become full. When the SYN-RCVD queue is full the server may drop the SYN packet, such that no SYN-ACK packet is sent to the client. When the client does not receive a SYN-ACK packet from the server, an open socket on the client is forced to wait for the missing SYN-ACK packet. Valuable processor time is consumed managing these waiting sockets, and the waiting sockets are unavailable to fire off new requests. As shown in FIG. 4, as the client attempts to continue to generate requests at higher and higher rates, the problem compounds, and the request generation rate slows down. This request throttling effect causes the actual load generated by the client testing tool application to plateau or even drop, even though the testing tool application may be attempting to make requests at a higher rate.

Banga and Druschel propose using scalable clients to solve this problem. Scalable clients are described in detail in Guarav Banga and Peter Druschel, *Measuring the Capacity of a Web Server* (Houston, Tex. 1997), the disclosure of which is herein incorporated by reference. A scalable client may be thought of as a pair of discrete HTTP processes, including a request process configured to request a connection with a server, and a handling process that waits for the server to respond to the request. By separating the request from the response, the limitation of the TCP/IP routines that cause throttling is thought by Banga and Druschel to be avoided.

One problem with this approach is that the separation of the two HTTP function using scalable clients requires considerable processor time. A system using scalable clients to generate synthetic Web traffic runs into a maximum load rate as the processor runs out of computing speed to handle the additional processes. The processor spends considerable time polling the handling processes. It has been found that using this method only about 400 connections may be established at once, which is not sufficient to simulate high server load conditions realistically.

Figure 5:
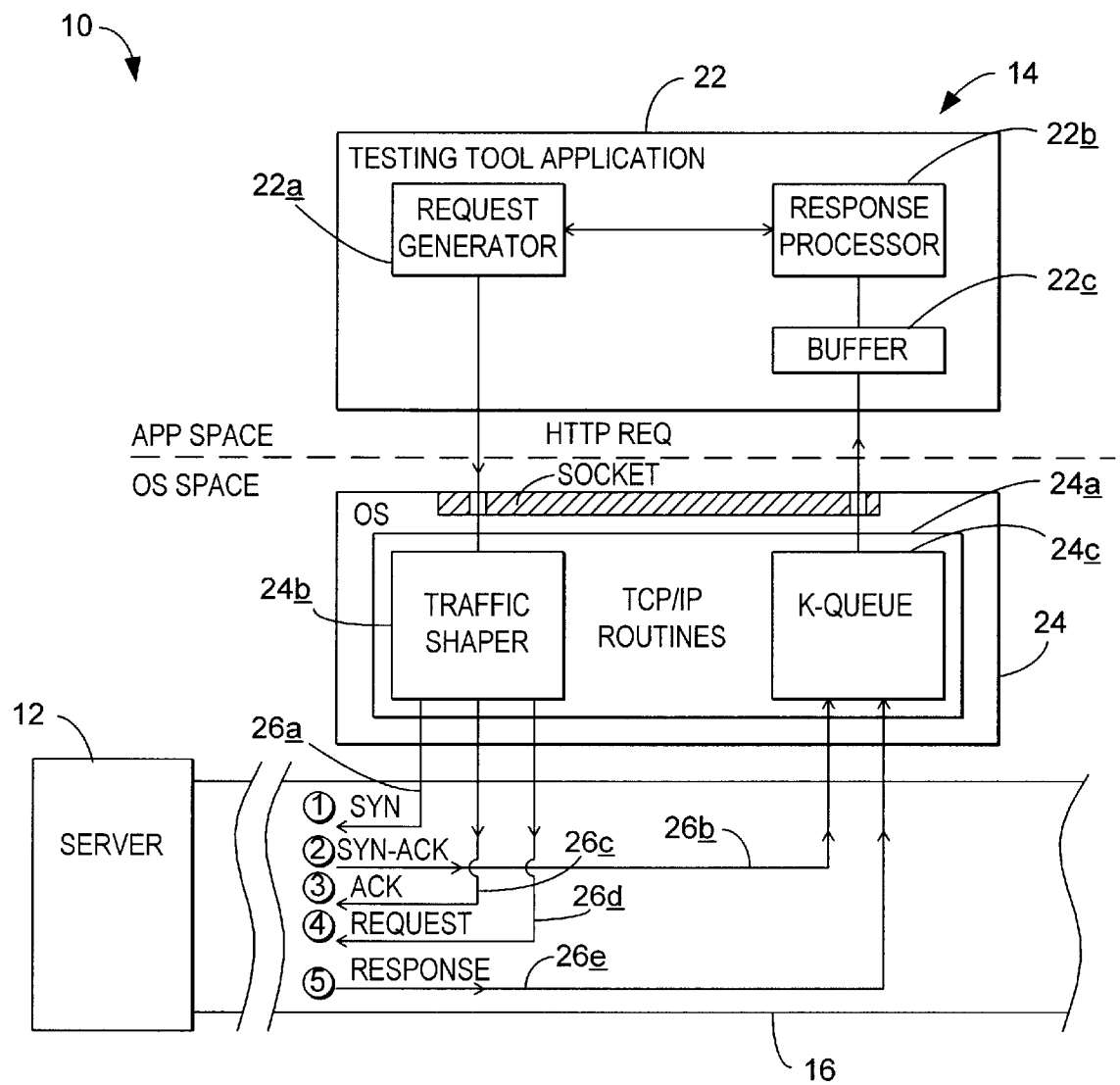
FIG. 5 is a schematic view of a software architecture showing data exchange between a client and server according to one embodiment of the present invention.

As shown in FIG. 5, client 14 is configured to execute a testing tool application 22 and an operating system 24.

Testing tool application 22 is typically a software program having a request generator 22a configured to open sockets connected via TCP/IP connections to server 12 and send requests to server 12 via the sockets.

Typically, request generator 22a is configured to generate a synthetic client pool 15, shown in FIGS. 1 and 2. Client pool 15 typically includes more than about 1000 synthetic clients connected simultaneously to server 12. According to another embodiment of the present invention, client pool 15 may include more than about 5000 connections. According to another embodiment, between 5000 and 25,000 connections may be used, and most preferably 15,000 connections. These ranges of synthetic clients have been found to be optimally sized to generate sufficient load to test nearly all commercially available web servers, while consuming minimal processor time such that the test client 14 does not slow down or crash.

Testing tool application 22 also includes a response processor 22b configured to receive and process responses from server 12. The responses may temporarily be stored in buffer 22c before passing to response processor 22b.

Operating system 24 typically includes TCP/IP routines 24a configured to send and receive data via TCP and IP protocols. Operating system 24 also typically includes a traffic shaper 24b configured to delay sending of data from TCP/IP routines 24a, to simulate connections of different bandwidths. One suitable traffic shaper that may be used is the DummyNet traffic shaper, readily available via the Internet for the FreeBSD operating system.

Operating system 24 also typically includes a Kernel Queue referred to as the K-QUEUE. A filter is typically set causing a response-received-event to be entered in the K-QUEUE in response to receipt of a response from server 12. An agent typically alerts response processor 22b upon entry of a response-received-event, and response processor 22b reads the socket associated with the response for data. Because the response processor 22b is alerted by the K-QUEUE when a response has been received, it does not have to poll each socket to determine whether data has been received. This saves valuable processor time, and is one reason the present invention is able to establish client pools with large numbers of simultaneous connections, as described above. The large numbers of simultaneous connections enable the embodiments of the present invention to simulate realistic heavy web traffic, without server throttling of the client request generation rate.

In operation, an HTTP request is generated by request generator 22a and sent to operating system 24 for TCP/IP processing by TCP/IP processing routines 24a. TCP/IP routines 24a execute a three-way handshake to establish a TCP connection with server 12. The first step in the handshake, shown at (1), is for TCP/IP routines 24a to send a SYN packet 26a to server 12. As the second step in the handshake, shown at (2), server 12 responds by sending a SYN-ACK packet 26b back to client 14. For the third step in the handshake, TCP/IP routines 24a send, via traffic shaper 24b, an ACK 26c back to server 12. Traffic shaper 24b delays the transmission of ACK 26c a calculated length of time to simulate a desired connection speed. This results in a more realistic simulation of slower connection speeds than prior test tools, which merely delayed the SYN-ACK.

Prior testing tool applications attempted to simulate a slower connection rate by delaying responses in a buffer similar to buffer 22c at the application level. This method yielded inaccurate simulations of slower connection speeds because the TCP/IP routines prematurely sent an ACK packet back to the server as soon as the SYN-ACK arrived from the server. The use of traffic shaper 24b by the present invention permits ACK packet 26c to be delayed, thus accurately simulating a slower connection. Using traffic shaper 24b enables testing tool application 22 to establish subsets of connections with different simulated connections speeds.

Under real world load conditions a web server on a wide area network, such as the Internet, will communicate with clients over a variety of connection types. For example, some clients will connect at high-speed broadband connections, while others will dial up to a network service provider and may connect at only 28.8 baud. To accurately simulate real world load conditions and responses to clients of different connection rates, testing tool application 22 may generate groups of connections to server 12 that have corresponding connection speeds slower than the actual speed of local area network 16.

FIG. 6, shows a group configuration interface 38 of testing tool application 22. Group configuration interface 38 permits a user to establish the connection parameters for each of several groups of synthetic clients. A user may select or enter a name for the group of synthetic clients, as indicated at 40. The user may also select a group weight 42, which determines the relative percentage of the synthetic clients created by testing tool application 22 that will belong to this group. For example, group weight 42 may be set at 60%, which would indicate that 60% of the clients in the synthetic client pool would share the group's selected connection parameters.

The user may also select a delay parameter 44 to adjust the length of time TCP/IP packets will be delayed. Delaying TCP/IP packets allows the testing tool application to simulate heavy traffic congestion on a network. Typically, the delay parameter will be specified in milliseconds. The user may further adjust a Qsize parameter 48, in order to affect the amount of memory allocated to the buffer where packets are stored during delays.

The user may also set a bandwidth parameter 46, in order to adjust the simulated connection speed over which packets will be transmitted. For example, the connection may be configured to transmit packets at 56 Kbit/s. This parameter enables simulation of different connection speeds for each group of synthetic clients.

The user may further adjust a packet loss rate parameter 50 (typically be a number between zero and one), which indicates a level of lost data packets over the simulated connection. The testing tool application is configured to drop a calculated certain percentage of the overall packets transmitted, which percentage is calculated based on the packet loss rate specified by the user.

An interface parameter 52 determines the name of the network interface, which will be used for generating the traffic load on the web server. The network interface is the hardware component that is used to by the client to communicate back and forth with the network. Each network interface card is assigned a name by the operating system. Thus, the client may have multiple network interfaces, and each group may take advantage of a different interface. Or, all groups may use a single network interface, etc.

The user may also alter a netmask parameter 56, which establishes the network addressing parameters for the local area network that is being used with testing tool application 22. Similarly, the user may adjust a broadcast IP parameter 54, which sets the network address of the computer running the testing tool application.

The user may also assign a virtual IP list 58, which provides a series of IP addresses that the group will cycle through when sending requests. Each time a synthetic client makes a request it uses an ephemeral port. When the request is completed the ephemeral port remains open and waiting for any stray packets of data for a period of time. This ties up the IP address that made that request while this wait period is elapsing. By cycling through virtual IP addresses the wait period does not slow down the rate at which the test system can generate requests. Typically, three virtual IP address lists are used.

Testing tool application 12 permits a user to configure as many groups of connections as the user desires. Each group may have its own group name and set of group parameters. The total group weights among all the user-defined groups will total to one hundred percent.

Each group uses a scenario to generate HTTP requests of server 12. The scenario may be configured using a scenario configuration interface, as indicated at 60 in FIG. 7. The scenario typically includes a name, resource list, weighting, and total count, as described below.

The scenario configuration interface enables a user to enter a name 62 for the scenario. The scenario configuration also enables a user to create and edit a scenario resource list 64. The scenario resource list is a list of web resources served by server 12. During testing of a server, testing tool application 22 will direct the synthetic clients to request the web resources listed in the scenario resource list.

The user may also adjust a total request count 66 via the scenario configuration interface 60, in order to set the total number of requests the synthetic clients will make during the test. Similarly, a weighting format 68 may be selected, the weighting format may be percentage-based, or may be based on the number of requests the test will make for each web resource in the scenario.

Weighting values 70 typically take the form of percentages if the percentage option is selected, as shown in FIG. 7. Alternatively, weighting values 70 may take the form of absolute counts of the number of request of each web resource in the web resource list. According to the percentage option, each resource will be requested based on a corresponding percentage of the request count 66 listed next to the resource. If an absolute count option is selected by the user, then the user may enter the number of times each resources is to be downloaded. Of course, the total number of requests for all resources will equals the total request count at 66.

Testing tool application 22 may include a generate scenario feature to create a scenario from log data stored on the web server to be tested. In FIG. 7, a generate scenario from server log button 72 corresponds to this feature. A server log typically contains historical data regarding the web resources requested from a particular server. Using this function, a user of testing tool application 22 may instruct the application to read the server log file, and generate a scenario from the server log file.

Testing tool application 22 is configured for two basic types of scenario generation. In the first, the scenario is created to be an exact duplication of all or a portion of a server log file. In the second, the testing tool application 22 is configured to apply statistical analysis to the server log and to generate a scenario based on the statistical analysis. For example, the testing tool application may create a scenario that includes a file that is the mean file size requested for a particular server. Or, the scenario may simulate a bell curve corresponding to the normal distribution of web resources contained in the server log. A user-selectable "O.K." button 74 may be configured to accept the scenario. While typically one scenario is applied to all groups during a particular test, it should be understood that each group may be configured to request web resources according to a unique scenario as well.

In summary, load test system 10 uses client 14 to generate a large pool of synthetic clients 15. Pool of synthetic clients 15 are divided into groups according to connection parameters to more accurately simulate real world server load conditions. A scenario defining the web resources to be requested is applied to the groups of synthetic clients, which in turn make web resource requests according to the configuration of the scenario. The response processor 22b of the testing tool application 22 is configured to track the performance of the server as the scenario is executed, and generate an output file of results for the test.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. A method of load testing a web server, comprising the steps of:
   providing a client computer configured to execute an operating system and a testing tool application, wherein the operating system includes an operating system queue and an operating system filter configured to set an event in the queue upon receipt of an HTTP response from the web server to an HTTP request from the application;
   opening a plurality of sockets configured to connect the testing tool application on the client computer to the web server;
   for each socket, sending a respective HTTP request from the testing application to the server via the socket; and
   alerting the application upon setting in the queue of an event by the filter indicating that an HTTP response to one of the HTTP requests has been received;
   wherein the step of alerting the application is accomplished without polling the plurality of open sockets to determine whether responses have been received, and thereby without server throttling of the client request generation rate.

2. The method of claim 1, wherein the plurality includes more than 1000 sockets.

3. The method of claim 1, wherein the plurality includes more than 5000 sockets.

4. The method of claim 1, wherein the plurality includes between about 5000 and 25000 sockets.

5. The method of claim 1, wherein the plurality includes about 15000 sockets.

6. The method of claim 1, wherein the testing tool application has a request generator configured to generate a plurality of synthetic clients, each synthetic client being configured to utilize a socket to send HTTP requests to the web server via a network, the method further comprising the step of:
establishing groups of clients within the plurality of synthetic clients, wherein each group of clients is configured to simulate a user-specified performance parameter.

7. The method of claim 6, wherein the user-specified performance parameter is bandwidth.

8. The method of claim 6, wherein the user-specified performance parameter includes a group weighting.

9. The method of claim 6, wherein the user-specified performance parameter includes delay time.

10. The method of claim 6, wherein the user-specified performance parameter includes Qsize.

11. The method of claim 6, wherein the user-specified performance parameter includes packet loss rate.

12. The method of claim 6, wherein the user-specified performance parameter is a network interface parameter related to a network interface for the group.

13. The method of claim 6, wherein the user-specified performance parameter includes a netmask.

14. The method of claim 6, wherein the user-specified performance parameter includes a broadcast IP address.

15. The method of claim 6, wherein the user-specified performance parameter includes a virtual IP address list.

16. A system for load testing a web server, comprising:
   an operating system;
   a load testing tool application having a request generator configured to generate a plurality of synthetic clients, each synthetic client being configured to utilize a socket to send HTTP requests to the web server via a network; and
   a response processor configured to receive an event notification from the operating system indicating that a response has been received from the web server without polling sockets.

17. The system of claim 16, wherein the plurality includes more than 1000 synthetic clients.

18. The system of claim 16, wherein the plurality includes more than 5000 synthetic clients.

19. The system of claim 16, wherein the plurality includes between about 5000 and 25000 synthetic clients.

20. The system of claim 16, wherein the plurality includes about 15000 synthetic clients.

21. The system of claim 16, further comprising:
   a group configuration interface configured to enable a user to specify a performance parameter for each of a plurality of groups of synthetic clients within the plurality of synthetic clients.

22. The system of claim 21, wherein the group configuration interface is configured to enable a user to specify simulated bandwidth for a group.

23. The system of claim 21, wherein the group configuration interface is configured to enable a user to specify a group weight for determining the portion of the load to be requested from the group.

24. The system of claim 21, wherein the group configuration interface is configured to enable a user to specify a delay time.

25. The system of claim 21, wherein the group configuration interface is configured to enable a user to specify a Qsize.

26. The system of claim 21, wherein the group configuration interface is configured to enable a user to specify a packet loss rate.

27. The system of claim 21, wherein the group configuration interface is configured to enable a user to specify an interface name to set the hardware network interface that the group will use to interface with the network.

28. The system of claim 21, wherein the group configuration interface is configured to enable a user to specify a netmask.

29. The system of claim 21, wherein the group configuration interface is configured to enable a user to specify a broadcast IP address.

30. The system of claim 21, wherein the group configuration interface is configured to enable a user to specify a virtual IP address list.

31. The system of claim 21, further comprising: a scenario configuration interface configured to enable a user to specify a scenario for the request generator, the scenario defining the web resources that the synthetic clients request.

32. The system of claim 31, wherein, in response to a user command, the request generator is configured to cause the synthetic clients to request the web resources from the scenario.

33. The system of claim 16, further comprising:
a scenario generator configured to generate a scenario of web resources that the synthetic clients are to request, the scenario generator being configured to generate the scenario based on log data from the web server.

34. The system of claim 33, wherein scenario is random selection of web resources on the web server log.

35. The system of claim 33, wherein the scenario is a statistical distribution of web resources contained on the web server log.

36. The system of claim 33, wherein the scenario is an exact reproduction of at least a portion of the web resources contained on the web server log.

37. The system of claim 33, wherein the response processor is further configured to measure web server performance.

38. A system for load testing a web server, comprising:
a client computer connected to the web server via a network and configured to execute an operating system and a testing tool application, wherein the operating system includes network communication routines, an operating system queue and an operating system filter configured to set an event in the queue upon receipt of an HTTP response from the web server to an HTTP request from the application, and wherein the testing tool application calls the network communication routines to open sockets configured to connect with and send HTTP requests to the web server;
an agent configured in the operating system to alert the application upon setting in the queue of an event by the filter indicating that an HTTP response to an HTTP request from the application has been received, without polling any open sockets to determine whether responses have been received, and without server throttling of the client request generation rate.

* * * * *